Jan. 7, 1930.  T. S. FORD  1,743,033
COFFEEPOT
Filed March 22, 1929  2 Sheets-Sheet 2
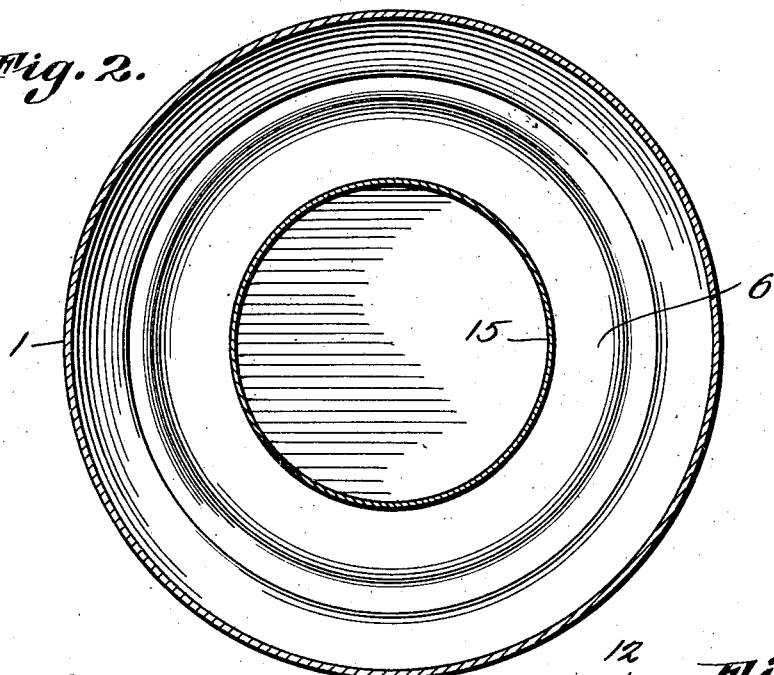
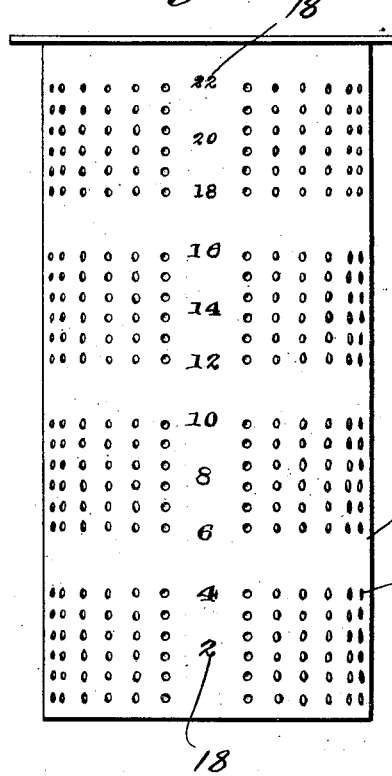
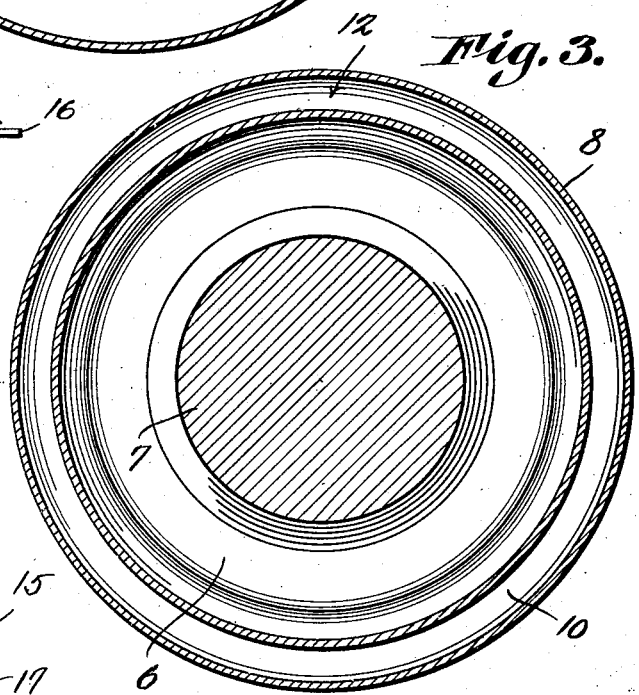
T. S. Ford
Inventor
By C. A. Snow & Co.
Attorneys.

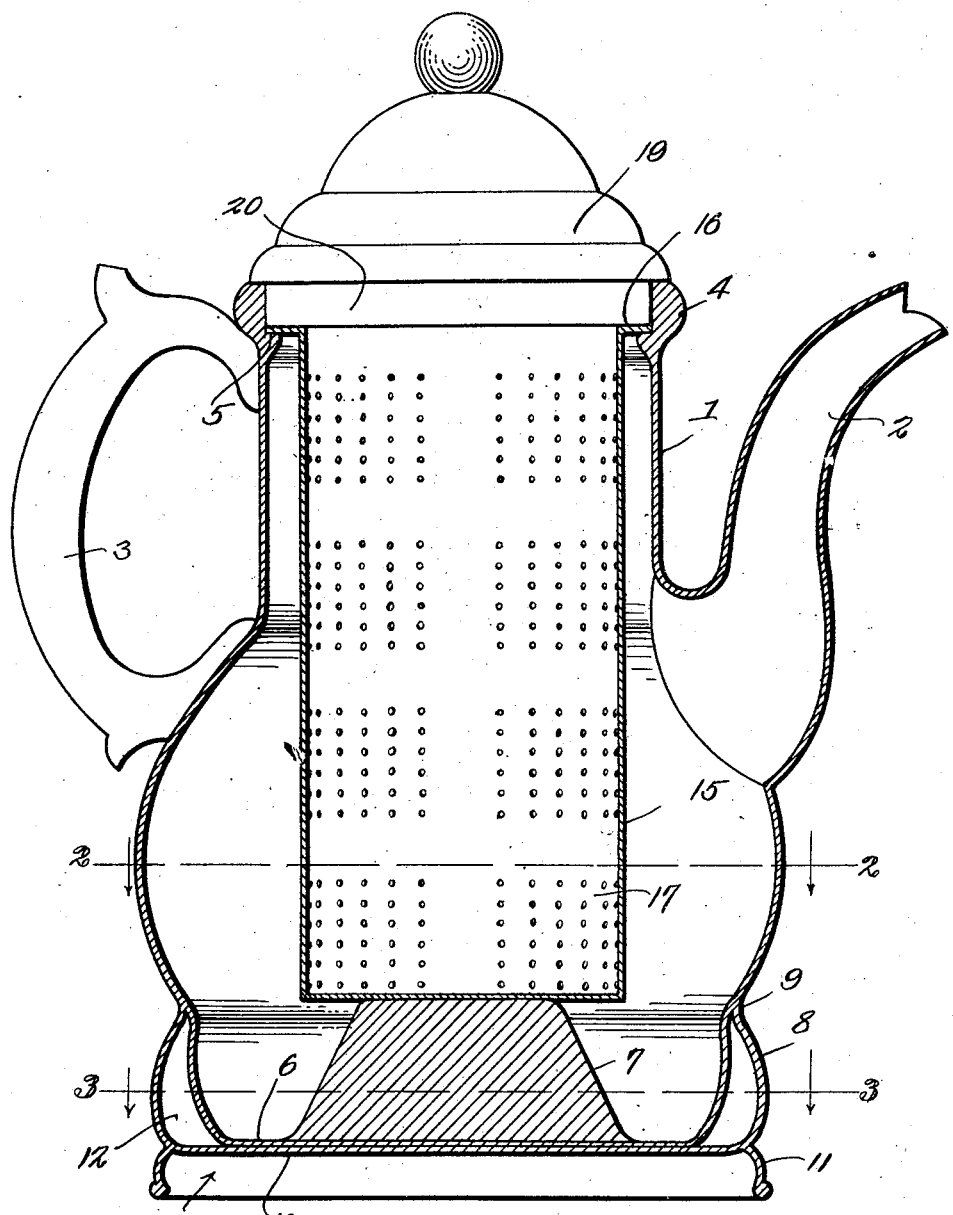

Patented Jan. 7, 1930

1,743,033

UNITED STATES PATENT OFFICE

TRACE S. FORD, OF DES MOINES, IOWA

COFFEEPOT

Application filed March 22, 1929. Serial No. 349,136.

This invention aims to provide a beverage pot, such as a coffee pot, so constructed that the beverage will remain hot for a long time after the pot has been removed from the source of heat supply. Another object of the invention is to provide novel means for supporting, in the pot, the container which holds the coffee. A further object of the invention is to provide means whereby the operator may gauge the amount of ground coffee in accordance with the amount of liquid coffee which is to be drawn.

It is within the province of the disclosure to improve generally and to enhance the utility of devices of that sort to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:

Figure 1 shows in vertical section, a coffee pot constructed in accordance with the invention;

Figure 2 is a cross-section on the line 2—2 of Figure 1;

Figure 3 is a cross-section on the line 3—3 of Figure 1;

Figure 4 is an elevation of the receptacle in which the ground coffee is placed.

The pot forming the subject matter of this invention is made of metal and includes a body 1 having a spout 2 and a handle 3. Around the upper end of the body 1 there is a thickened bead 4 within which is located a shoulder 5. The bottom of the body is marked with the numeral 6.

The bottom 6 carries a solid upstanding boss 7 of sufficient cross-sectional area and height to form an effective heat-retaining means. The boss 7 may be of frusto-conical form, as shown in the drawings.

An annular casing 8 surrounds the lower end of the body 1, the upper end of the casing being secured at 9 to the body 1. The casing 8 has a bottom 10 disposed beneath the bottom 6 of the body 1. The casing 8 forms an airchamber 12 around that portion of the body 1 wherein the boss 7 is located. The casing 8 is provided with a depending rim 11 forming an air space 14 beneath the bottom of the body and beneath the boss 7.

The numeral 15 marks a cylindrical container having graduations 18 indicating the number of cups of liquid coffee that can be made when the container is filled with ground coffee to the respective graduations. The container 15 has perforations 17. The container 15 may be supported in any desired way in the body 1. The container 15 is shown as resting on the boss 7, the container being provided at its upper end with a flange 16 engaging the bead 4. It will be observed, however, that either of these supporting instrumentalities may be used to the exclusion of the other. The lid of the coffee pot is marked by the numeral 19 and the construction of it is left largely to the desire of the manufacturer and the taste of the trade. The lid 19 may have an end 20 which extends down inside of the upper end of the body 1 and rests on the flange 16 of the container 15.

The double bottom shown at 6 and 10 is a good thing for several reasons, not the least of which is that it affords a reinforced construction for supporting the boss 7, the container 15, and the contents of the container, especially if the pot boils dry and the bottom of the pot becomes somewhat overheated. The boss 7 will retain the heat and keep the coffee hot for a long time after the pot has been removed from the stove, and the heat coming from the boss 7, is retained, owing to the air chamber 12 around the lower end of the body, and the air space 14 below the bottom of the pot. The rim 11 not only forms an air space at 14, but serves, as well, to lift the bottom 6—10 of the pot clear from the table on which the pot is mounted, thereby reducing the dissipation of heat from the boss 7 by conduction.

I claim:—

1. A beverage pot comprising a body including a bottom having a fixed upstanding boss of sufficient cross-sectional area and height to form an effective heat-retaining means, a casing surrounding the lower end of the body and secured at its upper end to the body, the casing defining a heat-insulating chamber about that portion of the body wherein the boss is located, the casing having a bottom disposed beneath the bottom of the body and reinforcing the bottom of the body in supporting the weight of the boss in the event of overheating, the casing being provided with a depending supporting and spacing rim forming an air chamber below the bottom of the casing and below the boss.

2. A beverage pot provided on its bottom with a fixed upstanding boss of sufficient cross-sectional area and height to form an effective heat-retaining means, the pot being provided with a heat-insulating chamber disposed about that portion of the body wherein the boss is located, the pot being supplied at its lower end with a depending supporting and spacing rim forming an air chamber below the boss.

3. A beverage pot provided on its bottom with a fixed upstanding boss of sufficient cross-sectional area and height to form an effective heat-retaining means, the pot being provided with a heat-insulating chamber disposed about that portion of the body wherein the boss is located.

4. A beverage pot provided on its bottom with a fixed upstanding boss of sufficient cross-sectional area and height to form an effective heat-retaining means, the pot being supplied at its lower end with a depending supporting and spacing rim forming an air chamber below the boss.

5. A beverage pot provided on its bottom with a fixed upstanding boss spaced from the side wall of the pot and of sufficient cross-sectional area and height to form an effective heat-retaining means the boss being solid.

In testimony that I claim the foregoing as my own, I have hereto affixed my signature.

TRACE S. FORD.